Sept. 29, 1959 P. R. HEYMES ET AL Re. 24,708

PROCESS AND APPARATUS FOR THE PRODUCTION
OF FIBERS FROM THERMOPLASTICS
Original Filed May 26, 1947

INVENTOR.
PIERRE RENE HEYMES &
IVAN PEYCHES.
BY Vernon W. Dorsey
ATTORNEYS.

United States Patent Office

Re. 24,708
Reissued Sept. 29, 1959

24,708

PROCESS AND APPARATUS FOR THE PRODUCTION OF FIBERS FROM THERMOPLASTICS

Pierre René Heymes and Ivan Peyches, Paris, France, assignors to Societe Anonyme des Manufactures des Glaces & Produits Chimiques de Saint-Gobain, Chauny & Cirey, Paris, France Original No. 2,624,912, dated January 13, 1953, Serial No. 750,610, May 26, 1947. Application for reissue September 3, 1953, Serial No. 378,441

Claims priority, application France May 31, 1946

21 Claims. (Cl. 18—2.5)

Matter enclosed in heavy brackets [ ] appears in the original patent but forms no part of this reissue specification; matter printed in italics indicates the additions made by reissue.

The present invention refers to a method and apparatus for the manufacture of fibers from glass or other thermoplastic materials.

The method according to our invention has for its object to submit to the drawing action of a gaseous current produced by the sudden loss of pressure, through an orifice or orifices, of the products resulting from a previous combustion in a combustion chamber, the thermoplastic material projected in the form of streamlets by centrifugal force, out of a rotating body.

In that method, the streamlets of thermoplastic material are projected by centrifugal force into an annular heated zone produced by the products of combustion and are submitted to the drawing action of said products.

According to a particular method for carrying out our invention the centrifuging body may be located in the combustion chamber having its expansion opening in the plane of projection of the streamlets from the centrifuging body.

In another embodiment of our invention the centrifuging body is located outwardly of the combustion chamber which is constituted by an annular chamber surrounding the centrifuging body. Said chamber is provided with an annular expansion opening, or with a plurality of expansion orifices arranged on a circle, directing the gaseous products resulting from the combination in said chamber on the streamlets of thermoplastic material projected from the periphery of the centrifuging body. The current or currents of the products of combustion may be directed transversely to the plane of projection of the streamlets. They also may have a component parallel to that plane or may be substantially parallel to that plane.

Referring to the accompanying drawings in which corresponding parts are designated by corresponding marks of reference, Figure 1 is a diagrammatic central, vertical section of an apparatus constructed in accordance with this invention and adapted to carry out the process here claimed;

Figure 1:
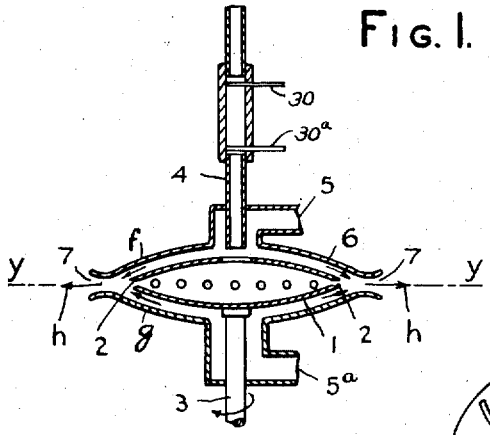

Referring to Figure 1, the centrifuge 1 is mounted on the upper end of the vertical shaft 3 which may be rotated in any well known manner. The top and bottom walls of the centrifuge converge to the periphery thereof to form an equatorial zone of small width in which are the ejection orifices 2. The centrifuge is contained within combustion chamber 6 generally symmetrical with the centrifuge and thus having its top and bottom walls approaching each other at their peripheries where they are separated by a space to form an annular escape nozzle 7 in the plane of the perforations 2.

A mixture of a combustible gas and air is simultaneously fed to the combustion chamber above and below the centrifuge by the pipes 5 and 5a. The combustible mixture is burnt in the combustion chamber and the gaseous products resulting from the combustion escape through the expansion annular opening 7. The shape of the combustion chamber is such that the currents of hot gasses, shown by arrows f and g, above and below the centrifuge meet substantially in the plane xy containing the ejection perforation 2 to form a resultant current, shown by arrow h, acting substantially in said plane.

Thermoplastic material such as glass, preferably in the form of fragments or balls, is fed to the centrifuge by the chute 4 located axially thereabove, entering the centrifuge through an open space in the crown thereof. As pressure exists in the lower edge of the chute provision must be made to prevent escape of gases from the combustion chamber through the chute. Thus two valves 30 and 30a in series may be placed in the chute near the top, forming a lock.

In the operation of this device the thermoplastic material will be ejected from the centrifuge by centrifugal force and after being ejected into the combustion zone, around the periphery of the centrifuge, will be attenuated into fibres by the drag exerted thereon by the products escaping through the annular expansion opening 7. The hot gases of the combustion chamber act also to heat the material in the centrifuge. They can heat it either by contact with the wall of said centrifuge, as it is the case for the gases introduced below, or by direct contact with the material itself, as it is the case for the gases introduced at the upper part which penetrate into the centrifuge by the open space in the crown thereof.

In the arrangement shown in Figure 2 the centrifuge is of the general construction before described in connection with Figure 1 but is mounted on the lower end of the chute 4a, being carried on a bearing 8 formed by a cone on the bottom of the centrifuge and a recessed bearing 8a, on the upper end of the combined gas and air feed pipe 5a. In addition, the bottom of the centrifuge has a series of vanes in form of turbine paddles 1a thereon moving in the bottom of the chamber below the centrifuge. The gases under pressure resulting from the combustion in this space and escaping out of the annular nozzle 7 cause the centrifuge to rotate at a high speed. The centrifugal adds its action to that of the gaseous current from the attenuation of the streamlets into fibers.

The chute 4a in this case makes tight connection with the top of the centrifuge. The centrifuge is heated by gases burning on the exterior thereof and while pressure exists therein, centrifugal force will be sufficient to cause projection of streamlets of the thermoplastic material.

Figure 2:
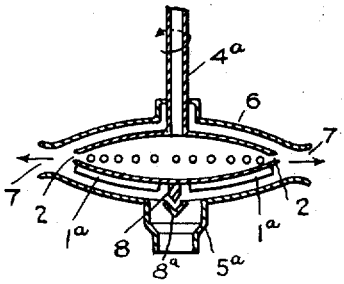
Figure 2 is a similar view of a modified form of apparatus.
Figure 3:
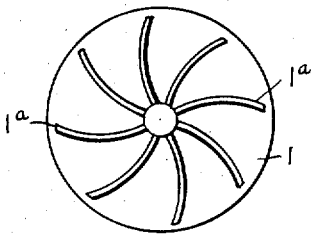
Figure 3 is an inverted view of the centrifuge shown in Figure 2.

In both examples shown on Figures 1 and 2 the motion of combustible and comburent gases in the combustion chamber 6 depends upon the shape of the exterior casing of said chamber 6 and upon that of the centrifuging body. The latter constitutes in fact a kind of partition within the combustion chamber by which the movement of the gases and particularly their speed is conditioned. In both these examples where the gases are axially fed, the gaseous currents move in divergent directions from this axis towards the periphery of the chamber. Under these conditions, it is possible to make the speed of the gaseous currents decrease from the center towards the periphery. By giving to these gases near the periphery a speed which is in the neighbourhood of the speed of the flame propagation, it is possible to have for the gases comprised between the center and the periphery of the chamber, a speed which is greater than the speed of the flame propagation. It is consequently possible when desired to localize the combustion in the vicinity of that periphery. To obtain a less localized heating, i.e. extending on a greater peripheral zone of the centrifuging body, it will be sufficient to give to the speed of the gases slightly lower values than those which have been mentioned hereabove; this may be done practically by modifying the shape of the centrifuge or of the combustion chamber, or by controlling the feeding.

To localize the combustion in certain zones of the chamber it is also possible to use the partition formed by the centrifuge to provide distinct passages for the combustible and for the comburent in order to make them gather and burn in only elected zones of the chamber. Thus in Figure 1 it is possible to feed separately the combustible gas and the air by the pipes 5 and *5a*, these gases meeting only in the zone where the streamlets of thermoplastic material are formed, at the periphery of the centrifuge.

On the contrary, it is possible, in order to make the centrifuging body and the material it contains benefit of the most important part of the heat produced by the combustion, to introduce the combustible and comburent gases into the centrifuge and to burn them within the centrifuge itself.

In this case the centrifuging body constitutes a part or even the whole of the combustion chamber.

Figure 4:
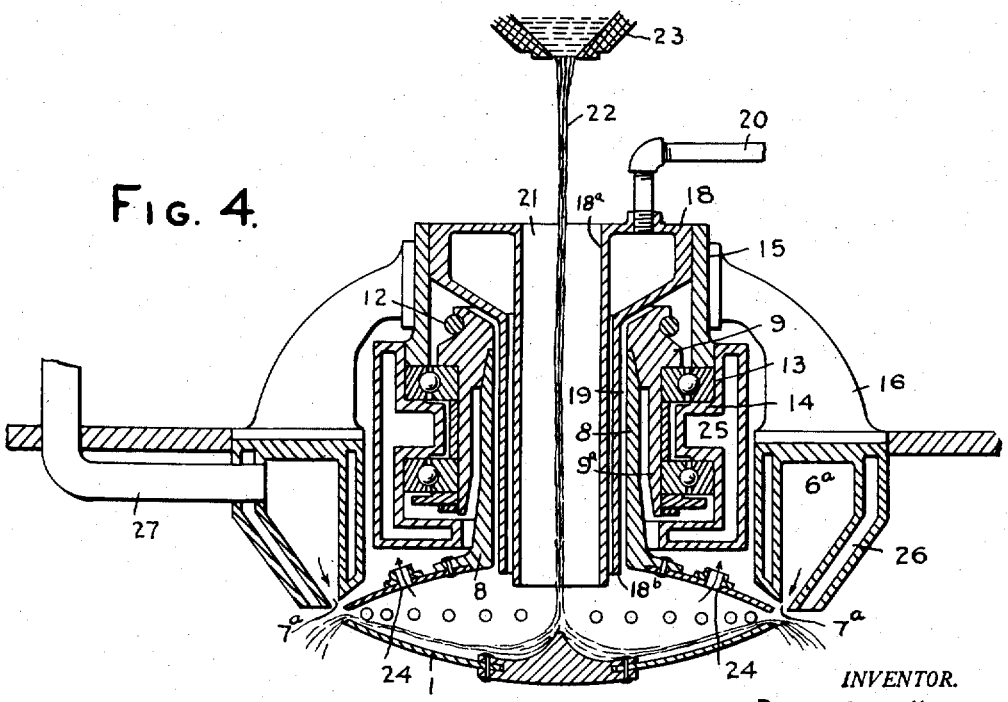
Figure 4 is a central vertical section of another embodiment of our invention.

In the construction shown in Figure 4 the centrifuge is tightly carried on the lower end of the tubular member 8, the upper end of which is fast on the inside of a collar 9 having a skirt 9a surrounding, but out of contact with, the tubular member so as to afford space for air insulation between them. The upper part of the collar is surrounded by a pulley groove to receive a belt 12 for rotating the centrifuge, while its lower part receives the inner sections of the runways 13 of the ball bearings, the opposite and stationary sections 14 being carried by brackets 16 through a tubular casing 15.

The upper end of the casing 15 is closed by the hollow plug 18. This plug has an enlarged head and two skirts 18a and 18b, the outer skirt being of restricted diameter to fit loosely in the interior of the tubular member 8 and so as to form a restricted annular passage 19 between it and the inner skirt. The combustible fluids are introduced in the plug by one or more pipes 20 and pass down through the annular passage 19 into the centrifuge where they are burnt.

Also carried by the brackets 16 is the stationary annular combustion chamber 6a fed by one or more fuel induction pipes 27 and discharging its products of combustion through an annular slot or nozzle 7a, situated above the equatorial zone in which the apertures in the centrifuge move and through which the material is projected.

The combustion chamber is provided with a double-walled casing enclosing a free space 26 through which an air circulation may be established to protect this casing against the high temperature developed within the chamber. This air may be used as a comburent contributing to obtain a very hot drawing gaseous current.

The bearing 13—14 may be protected by the water jacket 25.

The heated thermoplastic is fed into the centrifuge through the feed chute 21 formed by the inner skirt of the plug 18 from a suitable feeder 23, as is shown at 22. The products of combustion escape from the centrifuge through holes 24 in its top into a space surrounded by the combustion chamber, and escape outwardly over the top of the centrifuge.

Considering the several forms before described, it will be noted that (a) in each of them the material is projected by centrifugal force and that drag is thereafter exerted on the ejected material by an expanded blast, which, in Figures 1 and 2 is in the plane of projection of the material and at right angles thereto in Figure 4; (b) that in all forms the fibres are projected by centrifuging force into a highly heated annular zone, the projection being into the blast throat of the combustion chamber in the forms shown in Figures 1 and 2 and immediately within the blast throat of the latter; (c) that in the form shown in Figuse 1 it is possible to have the combustible and air mixed only at the space into which the streamlets of thermoplastic material are projected.

What is claimed is:

1. The hereinbefore described method of attenuating and drawing thermoplastic fibers which comprises revolving a body provided with a plurality of openings supporting a source of molten material at sufficient speed to discharge the material by centrifugal force from said openings in fiber form, providing a housing located exteriorly of said body, establishing and maintaining combustible and comburent at high temperature and pressure within said housing, discharging the gaseous products of combustion from said housing to the atmosphere through an annular constricted throat surrounding closely the openings in the centrifuge thereby directing said gaseous products of combustion at high temperature and high velocity into the path of the fibers close to their point of discharge from the openings in the centrifuge and before any substantial loss of heat from the molten fibers to initiate and continue the attenuation and drawing of the fibers close to the discharge point of the latter from the centrifuge.

2. The method specified in claim 1 characterized by discharging the fibers from the openings of the centrifuge into the throat of the housing wherein they are entrained and drawn by the gaseous products of combustion passing through and issuing from said throat.

3. The combination of a centrifuge provided with a plurality of openings for the discharge of streamlets of thermoplastic material therefrom, a housing provided with walls shaped to define a combustion chamber located exterior to said centrifuge, said combustion chamber being provided with at least one converging wall terminating in an annular throat opening to the atmosphere and surrounding the openings in said centrifuge, said annular throat being positioned to direct a blast of hot expanding gas travelling at high velocity into the path of the streamlets as they issue from the centrifuge whereby said streamlets are attenuated and drawn as they issue from the openings in the centrifuge and before any substantial loss of heat therefrom, and means for maintaining combustible and comburent in said chamber.

4. In apparatus for producing fibers from thermoplastic material, the combination of a centrifuge provided with a plurality of annularly arranged openings for the discharge of streamlets of thermoplastic material therefrom, a housing located exteriorly of the centrifuge and in close proximity thereto provided with walls defining a combustion chamber, said housing being provided with an annular discharge aperture opening to the atmosphere closely surrounding the openings in the centrifuge shaped to constrict and thereafter permit expansion of the gaseous products of combustion escaping from said chamber at high temperature and high velocity and to direct said gaseous products of combustion into the path of the streamlets as they issue from the openings in the centrifuge and before any substantial loss of heat therefrom whereby said streamlets are attenuated and drawn as they issue from the openings in the centrifuge, and means for maintaining combustible and comburent in said chamber.

5. In apparatus for producing fibers from thermoplastic material, the combination of a centrifuge provided with a plurality of openings for the discharge of streamlets of thermoplastic material therefrom, a housing exterior of the centrifuge provided with a plurality of walls at least one of which is located above the centrifuge, said walls having a portion converging to form an annular throat opening to the atmosphere surrounding the openings in the centrifuge, said walls being positioned to direct expanding gaseous products of combustion at high temperature and velocity into the path of the streamlets as they issue from the openings of the centrifuge thereby attenuating and drawing the streamlets prior to any substantial cooling thereof from their point of anchorage to the centrifuge and means for maintaining combustible and comburent in said chamber.

6. The apparatus defined in claim 3 wherein the centrifuge with its openings is positioned to discharge the streamlets into the annular throat of the housing and from which they are drawn by the gaseous products of combustion issuing from said throat.

7. The apparatus defined in claim 4 wherein the annular discharge aperture is positioned to direct the gaseous products of combustion transversely of the plane of discharge of the fibers from the openings in the centrifuge.

8. In a device for producing fibers from thermoplastic material, the combination of a centrifuge having apertures in its equatorial zone, an upright hollow support for the centrifuge having depending skirts, a hollow casing, a hollow annular plug in the top of the casing, having two skirts within the central space of the support, means for introducing combustible gases into the hollow plug, an annular combustion chamber having an annular nozzle above the periphery of the centrifuge, and means for introducing combustible gases into the combustion chamber.

*9. The process of making glass fibers which comprises burning a combustible mixture of gases and discharging the burned gases in the form of a single ring-like blast of gas moving downwardly at a rate sufficient to attenuate softened glass into fine fibers, flowing a body of heat softened glass by centrifugal force in a generally radial direction normal to the movement of the blast, separating the body of glass as it flows under the influence of centrifugal force into a multiplicity of individual streams of glass, projecting the streams with sufficient force to enter but not go through the ring-like blast, and reheating and drawing out the streams into fine fibers by the heat and force of the blast.*

*10. The process of making glass fibers which includes burning a combustible mixture of gases and discharging the burned gases in the form of a ring-like blast of gas moving at a rate sufficient to attenuate glass into fine fibers, moving a mass of heated glass by centrifugal force in a generally radial direction transverse to the movement of the blast, separating the mass of glass as it flows under the influence of centrifugal force into a multiplicity of individual elongated bodies of glass, projecting the elongated bodies of glass with sufficient force to enter but not go through the ring-like blast, and reheating and drawing out the elongated bodies into fine fibers by the heat and force of the blast.*

*11. The process of making glass fibers which includes burning a combustible mixture of gases and discharging the burned gases in the form of a ring-like blast of gas moving at high velocity, moving a body of heated glass by centrifugal force in a generally radial direction transverse to the movement of the blast, separating the body of glass as it moves under the influence of centrifugal force to form a multiplicity of rods of glass, projecting the rods with sufficient force to enter but not go through the ring-like blast, and reheating and drawing out the rods into fine fibers by the heat and force of the blast.*

*12. The process of making glass fibers which comprises burning a combustible mixture of gases and discharging the burned gases in the form of a single ring-like blast of gas moving downwardly at a rate sufficient to attenuate softened glass into fine fibers, flowing a body of heat softened glass by centrifugal force in a generally radial direction normal to the movement of the blast, separating the body of glass as it flows under the influence of centrifugal force into a multiplicity of individual streams of glass, projecting the streams with sufficient force to enter the ring-like blast, and reheating and drawing out the streams into fine fibers by the heat and force of the blast.*

*13. The process of making glass fibers which includes burning a combustible mixture of gases and discharging the burned gases in the form of a ring-like blast of gas moving at a rate sufficient to attenuate glass into fine fibers, moving a mass of heated glass by centrifugal force in a generally radial direction transverse to the movement of the blast, separating the mass of glass as it flows under the influence of centrifugal force into a multiplicity of individual elongated bodies of glass, projecting the elongated bodies of glass with sufficient force to enter the ring-like blast, and reheating and drawing out the elongated bodies into fine fibers by the heat and force of the blast.*

*14. The process of making glass fibers which includes burning a combustible mixture of gases and discharging the burned gases in the form of a ring-like blast of gas moving at high velocity, moving a body of heated glass by centrifugal force in a generally radial direction transverse to the movement of the blast, separating the body to glass as it moves under the influence of centrifugal force to form a multiplicity of rods of glass, projecting the rods with sufficient force to enter the ring-like blast, and reheating and drawing out the rods into fine fibers by the heat and force of the blast.*

*15. The process of making glass fibers which comprises burning a combustible mixture of gases and discharging the burned gases in the form of a single ring-like blast of gas moving downwardly at a rate sufficient to attenuate softened glass into fine fibers, flowing a body of heat softened glass by centrifugal force in a generally radial direction normal to the movement of the blast, separating the body of glass as it flows under the influence of centrifugal force into a multiplicity of individual streams of glass, projecting the streams with sufficient force to enter and be entrained by the ring-like blast, and reheating and drawing out the streams into fine fibers by the heat and force of the blast.*

*16. The process of making glass fibers which includes burning a combustible mixture of gases and discharging the burned gases in the form of a ring-like blast of gas moving at a rate of sufficient to attenuate glass into fine fibers, moving a mass of heated glass by centrifugal force in a generally radial direction transverse to the movement of the blast, separating the mass of glass as it flows under the influence of centrifugal force into a multiplicity of individual elongated bodies of glass, projecting the elongated bodies of glass with sufficient force to enter and be entrained by the ring-like blast, and reheating and drawing out the elongated bodies into fine fibers by the heat and force of the blast.*

*17. The process of making glass fibers which includes burning a combustible mixture of gases and discharging the burned gases in the form of a ring-like blast of gas moving at high velocity, moving a body of heated glass by centrifugal force in a generally radial direction transverse to the movement of the blast, seperating the body of glass as it moves under the influence of centrifugal force to form a multiplicity of rods of glass, projecting the rods with sufficient force to enter and be entrained by the ring-like blast, and reheating and drawing out the rods into fine fibers by the heat and force of the blast.*

*18. The process of making fibers from a heat softenable material which comprises burning a combustible mixture of gases within a substantially closed chamber and discharging the burned gases generally outwardly and radially from the chamber in the form of a blast moving at a velocity sufficient to attenuate the heat softened material into fibers, heating a body of the material to soft-*

*ened state within said chamber, subjecting a body of said heat softened material to the action of centrifugal force to flow the heat softened material into the blast, and entraining the heat softened material in the blast whereby the material is carried away from the chamber by the blast and is attenuated into fibers by the heat and force of the blast.*

*19. The process of making fibers from a material capable of being softened by heat which comprises burning a combustible mixture of gases within a substantially closed chamber and discharging the burned gases from a restricted outlet in a wall of the chamber in the form of a substantially continuous annular blast moving at a velocity sufficient to attenuate heat softened material into fibers, heating a body of the material to a molten state within said chamber, subjecting the heat softened material to the action of centrifugal force to flow the heat softened material under the influence of the centrifugal force outwardly into the annular blast of the burned gases discharged from the chamber whereby the heat-softened material is carried away from the chamber by the blast, and attenuating the heat softened material into fibers by the heat and force of the blast.*

*20. The process of making fibers from a heat softenable material capable of being drawn out into fibers when in a softened state which comprises burning a combustible mixture of gases within a substantially closed chamber and discharging the burned gases from the chamber in the form of a radially directed blast moving at a velocity sufficient to attenuate the heat softened material into*

*fibers, discharging a body of said material in a molten state by centrifugal force into said blast, and entraining the material in the blast whereby the material is attenuated to fibers by the heat and force of the blast.*

*21. The process of making fibers from a heat softenable material which comprises burning a combustible mixture of gases in a substantially closed chamber and discharging the burned gases from the chamber in the form of an annular radially directed blast moving at a velocity sufficient to attenuate the heat softened material into fibers, subjecting a body of said heat softened material to the action of centrifugal force to flow the material under the influence of the centrifugal force into the blast whereby the material is conveyed from the chamber by the blast, and attenuating the softened material into fibers ated to fiber by the heat and force of the blast.*

References Cited in the file of this patent or the original patent

UNITED STATES PATENTS

| | | |
|---|---|---|
| 1,289,779 | Howard | Dec. 31, 1918 |
| 2,338,473 | Von Pazsiczky | Jan. 4, 1944 |
| 2,431,205 | Slayter | Nov. 18, 1947 |
| 2,450,363 | Slayter et al. | Sept. 28, 1948 |
| 2,497,369 | Peyches | Feb. 14, 1950 |
| 2,603,833 | Stalego et al. | July 22, 1952 |

FOREIGN PATENTS

| | | |
|---|---|---|
| 571,807 | Germany | Feb. 16, 1933 |
| 377,806 | Italy | Jan. 9, 1940 |